United States Patent
Cox et al.

(10) Patent No.: US 9,089,124 B1
(45) Date of Patent: Jul. 28, 2015

(54) DRAGGING APPARATUS AND ASSEMBLY FOR HUNTERS

(71) Applicants: James Clint Cox, Checotah, OK (US); Nyssa Marie Cox, Checotah, OK (US)

(72) Inventors: James Clint Cox, Checotah, OK (US); Nyssa Marie Cox, Checotah, OK (US)

( * ) Notice: Subject to any disclaimer, the term of this patent is extended or adjusted under 35 U.S.C. 154(b) by 0 days.

(21) Appl. No.: 14/498,690

(22) Filed: Sep. 26, 2014

(51) Int. Cl.
| | |
|---|---|
| *A01M 31/00* | (2006.01) |
| *A45F 5/00* | (2006.01) |
| *A01M 31/06* | (2006.01) |
| *A45F 5/02* | (2006.01) |

(52) U.S. Cl.
CPC .............. *A01M 31/00* (2013.01); *A01M 31/06* (2013.01); *A45F 5/004* (2013.01); *A45F 5/021* (2013.01)

(58) Field of Classification Search
CPC .................................................. A01M 31/006
USPC .................................. 224/162, 184, 103, 220
See application file for complete search history.

(56) References Cited

U.S. PATENT DOCUMENTS

| | | | | |
|---|---|---|---|---|
| 1,990,135 | A * | 2/1935 | Sato ........................... | 242/588.1 |
| 2,437,331 | A * | 3/1948 | Murray et al. ................ | 224/103 |
| 2,855,133 | A * | 10/1958 | Mullin .......................... | 224/184 |
| 2,931,629 | A * | 4/1960 | Keller .......................... | 254/409 |
| 2,996,228 | A * | 8/1961 | Bauman ........................ | 224/184 |
| 3,038,644 | A * | 6/1962 | Johnson ........................ | 224/184 |
| 3,074,074 | A * | 1/1963 | Lovering ............................ | 2/94 |
| 3,077,292 | A * | 2/1963 | Gehrke ........................ | 224/184 |
| 3,346,154 | A | 10/1967 | Bishop | |
| 4,161,266 | A * | 7/1979 | Howarth, Jr. ................. | 224/645 |
| 4,650,073 | A * | 3/1987 | Young ........................... | 206/409 |
| 4,662,078 | A * | 5/1987 | Gammon et al. ............... | 33/413 |
| 4,706,858 | A * | 11/1987 | Whatley ........................ | 224/184 |
| 4,844,373 | A * | 7/1989 | Fike, Sr. ..................... | 242/588.1 |
| 4,925,070 | A * | 5/1990 | Tulgan .......................... | 224/627 |
| 4,977,860 | A | 12/1990 | Harwell | |
| 5,082,156 | A * | 1/1992 | Braun .......................... | 224/220 |
| 5,388,877 | A * | 2/1995 | Wenk ............................ | 294/219 |
| D377,862 | S * | 2/1997 | Moore ........................... | D3/228 |
| 5,638,772 | A | 6/1997 | Kaufmann et al. | |
| 5,829,060 | A * | 11/1998 | Falk et al. ........................ | 2/102 |
| 6,006,968 | A * | 12/1999 | McCarthy et al. ............. | 224/184 |
| 6,012,167 | A * | 1/2000 | De Rosa et al. ..................... | 2/94 |
| 6,142,547 | A * | 11/2000 | Bowerman ..................... | 294/150 |
| 6,290,158 | B1 * | 9/2001 | Huang .......................... | 242/379 |
| 6,732,834 | B2 | 5/2004 | Colorado | |
| 7,125,331 | B1 * | 10/2006 | Sayers .......................... | 452/189 |
| 7,320,421 | B2 | 1/2008 | Guminski | |
| 7,658,307 | B2 * | 2/2010 | Skupin .......................... | 224/681 |

(Continued)

FOREIGN PATENT DOCUMENTS

DE 20000789 U1 4/2000

OTHER PUBLICATIONS

Internet Website: http://www.rap4.com/store/paintball/p/001760/medic-pouch-german-flecktarn.

*Primary Examiner* — Justin Larson
(74) *Attorney, Agent, or Firm* — Dennis D. Brown; Brown Patent Law, P.L.L.C.

(57) ABSTRACT

A hunting assembly for dragging game or predators such as coyotes or bobcats. A belt or waste strap which carries one, two, or more drag pouches or other containers is secured around the hunter's waist. A drag cord with a loop at the end thereof is retained and carried by each of the containers. The drag cords are extended from the containers for dragging the game or predators to the hunter's vehicle or camp or to any other location.

10 Claims, 4 Drawing Sheets

(56) References Cited

U.S. PATENT DOCUMENTS

| | | |
|---|---|---|
| 8,292,341 B1 * 10/2012 | Sokoly | 294/152 |
| 8,342,137 B1 1/2013 | Burkhardt | |
| 8,505,114 B1 * 8/2013 | Earley | 2/94 |
| 8,556,313 B2 * 10/2013 | Miller et al. | 294/82.1 |
| 8,573,359 B2 11/2013 | West | |
| 8,678,255 B2 * 3/2014 | Zhang et al. | 224/162 |
| 8,714,358 B2 * 5/2014 | Debitzky | 206/702 |
| 8,840,161 B1 * 9/2014 | Gardner | 294/145 |
| 2005/0115997 A1 * 6/2005 | Nouvel De La Fleche | 224/162 |
| 2005/0115998 A1 6/2005 | Swenson | |
| 2005/0258203 A1 * 11/2005 | Weaver | 224/162 |
| 2006/0043128 A1 * 3/2006 | Cushman | 224/162 |
| 2010/0193288 A1 8/2010 | Colorado | |
| 2011/0031288 A1 2/2011 | Schultz | |
| 2012/0168472 A1 * 7/2012 | Mathews | 224/162 |
| 2013/0008933 A1 1/2013 | Clifford | |
| 2013/0042818 A1 2/2013 | Capoano | |

\* cited by examiner

DRAGGING APPARATUS AND ASSEMBLY FOR HUNTERS

FIELD OF THE INVENTION

The present invention relates to apparatuses, assemblies and methods for dragging game or for dragging coyotes, bobcats or other predators.

BACKGROUND OF THE INVENTION

When hunting game or predators such as coyotes or bobcats, it will often be necessary for the hunter to drag the game or predators a considerable distance to the hunter's vehicle or camp or to some other location.

One device used heretofore for dragging coyotes is referred to as a coyote handle. The coyote handle typically comprises a rope or other dragging cord which is connected at one end to a hand grip which is formed, for example, from a piece of wood or bone. A loop is provided in the other end of the dragging cord for placement around the animal's head, muzzle, and/or front feet.

Another type of coyote dragging device, referred to as a coyote drag, comprises a drag rope or other dragging cord which extends from a shoulder strap. The left or right arm of the hunter is inserted through the shoulder strap for placement of the shoulder strap on the hunter's shoulder.

Yet another type of dragging device, typically used for larger game, comprises a rope or other dragging cord which extends from an upper body harness or vest which is placed around both of the hunter's shoulders.

Unfortunately, each of these prior devices occupies the hunter's hand, arms, and/or shoulders, thus preventing or restricting the use of the hands, arms, and/or shoulders for other purposes such as carrying a rifle and/or other items, wearing a back pack, wearing or placing other items on the hunter's upper body, moving brush or limbs while walking, clearing obstacles from the path, etc.

A need therefore exists for an effective, low cost device for dragging game or predators which will also free the hunter's hands, arms, shoulders, and upper body for other purposes.

SUMMARY OF THE INVENTION

The present invention provides an apparatus and an assembly for dragging game and predators which satisfy the needs and alleviate the problems discussed above. Although also useful for dragging larger animals, the inventive apparatus and assembly are particularly well suited for dragging predators, such as coyotes or bobcats, and other animals of similar or smaller size.

In one aspect, there is provided an apparatus for dragging game or predators comprising: a container having a holding structure for holding the container on a belt or waist strap; a dragging cord which is receivable in the container for storage and is extendable from the container for dragging a dead animal; and a loop provided at the distal end of the dragging cord for placement around a portion of the body of the dead animal.

In another aspect, there is provided an assembly for dragging game or predators comprising: a belt or waste strap and one or more containers carried by the belt or waist strap. Each of the containers has a dragging cord which is receivable in the container for storage and is extendable from the container for dragging game or predators. Also, each dragging cord has a loop provided at the distal end of the dragging cord for placement around a portion of the body of a dead animal.

Further aspects, features, and advantages of the present invention will be apparent to those of ordinary skill in the art upon examining the accompanying drawings and upon reading the following Detailed Description of the Preferred Embodiments.

DETAILED DESCRIPTION OF THE PREFERRED EMBODIMENTS

Figure 1:
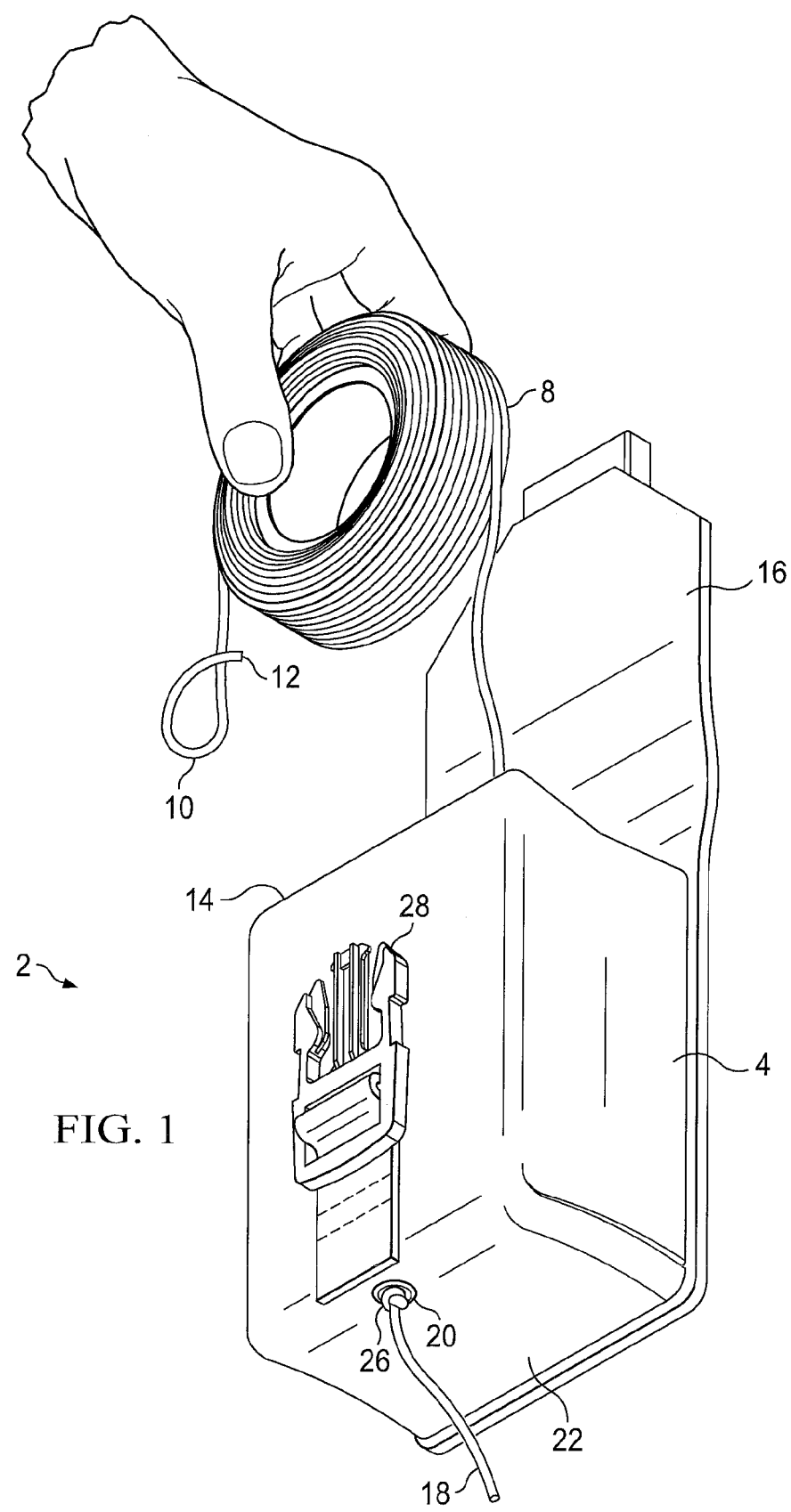
FIG. 1 is a front perspective view illustrating an embodiment 2 of the inventive apparatus for dragging game or predators.
Figure 2:
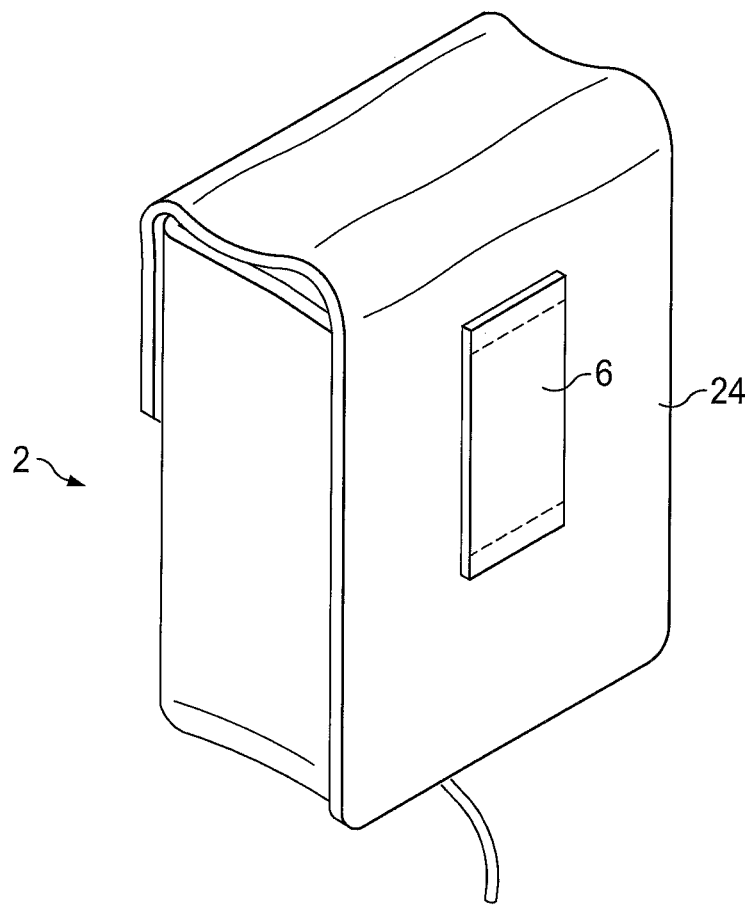
FIG. 2 is a rear view of the inventive apparatus 2.

An embodiment 2 of the inventive apparatus for dragging game or predators is illustrated in FIGS. 1 and 2. The inventive dragging apparatus 2 comprises: a container 4; a holding structure 6, preferably on the back side of the container 4, for holding the container 4 on a belt or waist strap; a dragging cord 8 which is receivable in the container 4 for storage and is extendable from the container 4 for dragging the game or predator; and a loop 10 which is provided at the distal end 12 of the dragging cord 8 for placement around the around the neck, muzzle, front feet, and/or other portion of the body of the dead animal.

The container 4 includes an opening 14 with a cover 16 for opening and closing the opening 14. The opening 14 is preferably located in the top of the container 4. The dragging cord 8 can be coiled and placed into the container 4 through the opening 14 for storage. Subsequently, when the dragging cord 8 is needed for use, the cover 16 can be opened and the coiled portion of the dragging cord 8 can be removed from the container 4 and extended to the animal. However, the proximal end 18 of the dragging cord 8 is retained by the container 4 to hold the proximal end 18 of the dragging cord 8 secure when pulling the dragging cord 8 to drag the animal.

Although any type of container 4 can be used which is suitable for placement on a belt or waist strap and which has sufficient strength for retaining the proximal end 18 of the dragging cord 8 when dragging the animal, the container 4 will preferably be a pouch, most preferably of a military type, with a small eyelet or other reinforced opening 20 through which the proximal end 18 of the dragging cord 8 is received and retained. The retaining opening 20 for the dragging cord 8 can be provided through the bottom 22, the back 24, or any other desired portion of the container 4. A knot, bead, washer, or other retaining structure 26 is provided in or on the proximal end portion 18 of the dragging cord 8 to prevent the proximal end portion 18 of the dragging cord 18 from being pulled through the retaining opening 20 of the container when dragging the animal.

A buckle, snap, Velcro attachment, or other fastener 28 is preferably provided on the container 4 for fastening the container cover 16 in closed position when the dragging cord 8 is stored in the container 4.

As used herein and in the claims, the term "dragging cord" refers to any rope, line, cable, ligature, or other type of cord having sufficient strength for dragging the game or predator. The loop 10 provided at the distal end 12 of the dragging cord 8 will preferably be expandable, for placing the loop 10 on and removing the loop 10 from the animal, and contractible for tightening the loop 10 around the animal when dragging. The loop 10 can be a noose tied in the distal end portion 12 of the dragging cord 8 or any other type of expandable and contractible loop provided in or on the distal end 12 of the dragging cord 8.

The holding structure 6 provided on the container 4 can be a loop for receiving a belt or waist strap, a clip which is attachable to a belt or waist strap, or any other type of structure which is effective for retaining the inventive dragging apparatus 2 on a belt or waist strap. Alternatively, the container 4 of the inventive dragging apparatus 2 can be permanently attached to a belt or waist strap by sewing, riveting, or other permanent attachment.

Figure 3:
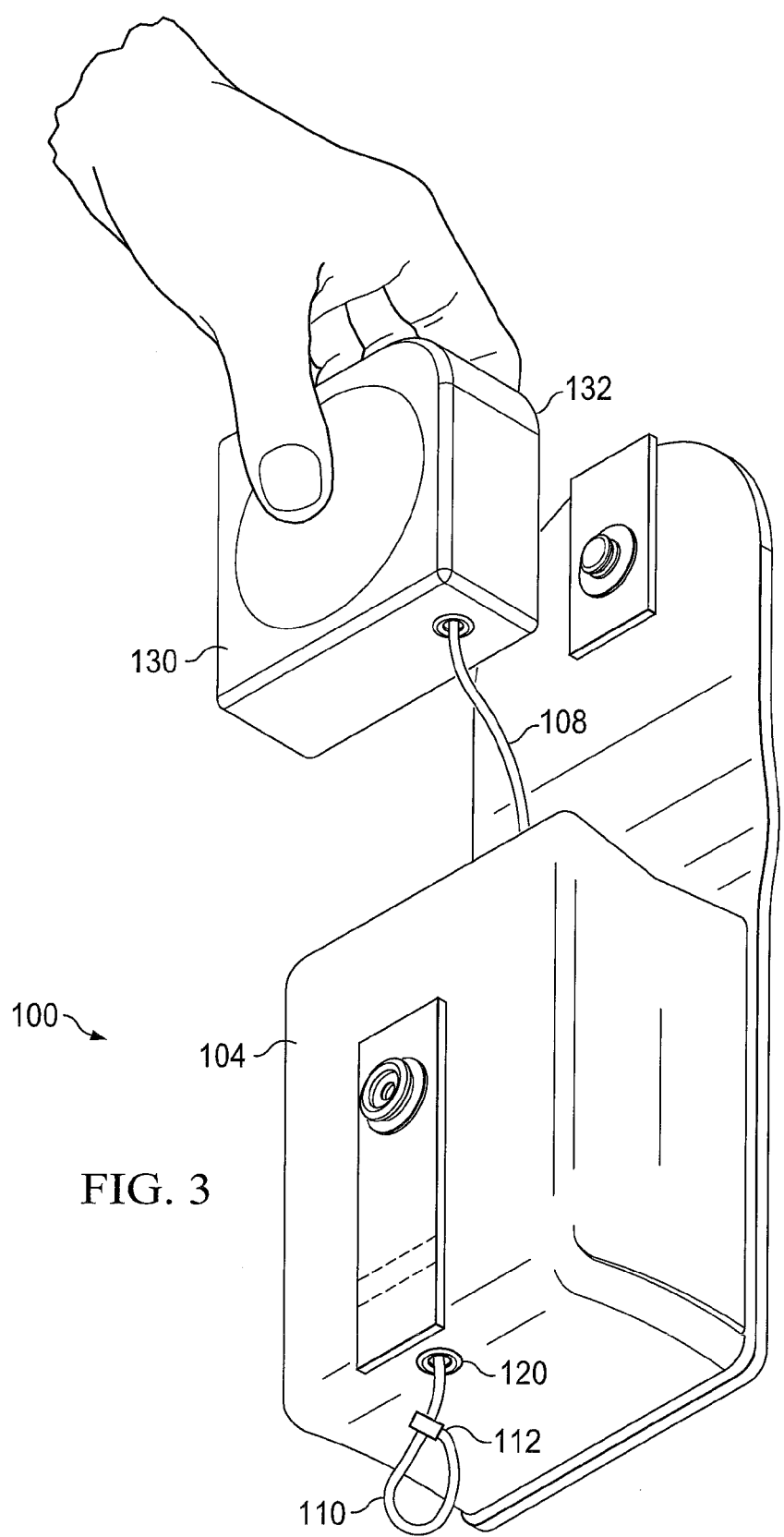
FIG. 3 is a front perspective view illustrating an embodiment 100 of the inventive apparatus for dragging game or predators.

An alternative embodiment 100 of the inventive dragging apparatus is illustrated in FIG. 3. The inventive dragging apparatus 100 is similar to the embodiment 2 described above except that, in the inventive apparatus 100: (a) the proximal end of the dragging cord 108 is attached to a self-winding reel 130; (b) the self-winding reel 130 is removably positionable or permanently positioned in the container 104; and (c) when the dragging cord 108 is wound in storage position by the self-winding reel 130, a distal end portion 112 of the cord 108 projects through an eyelet or other opening 120 provided through the bottom, through the front, or through any other desired portion of the container 104. The distal end portion 112 of the cord 108 which projects through the opening 120 includes the loop 110.

The resulting self-winding dragging cord 108 can be extended to the animal for attachment and dragging but will then automatically return to its wound storage position within the container 104 when the animal is released. The self-winding reel 130 will preferably employ a spring coil mechanism such as commonly used in tape measures and other devices.

In yet another alternative embodiment, the self-winding reel 130 has a reel housing 132 which will itself act as the container for the dragging cord 108 so that the reel housing itself is directly attached or attachable to the belt or waist strap.

Figure 4:
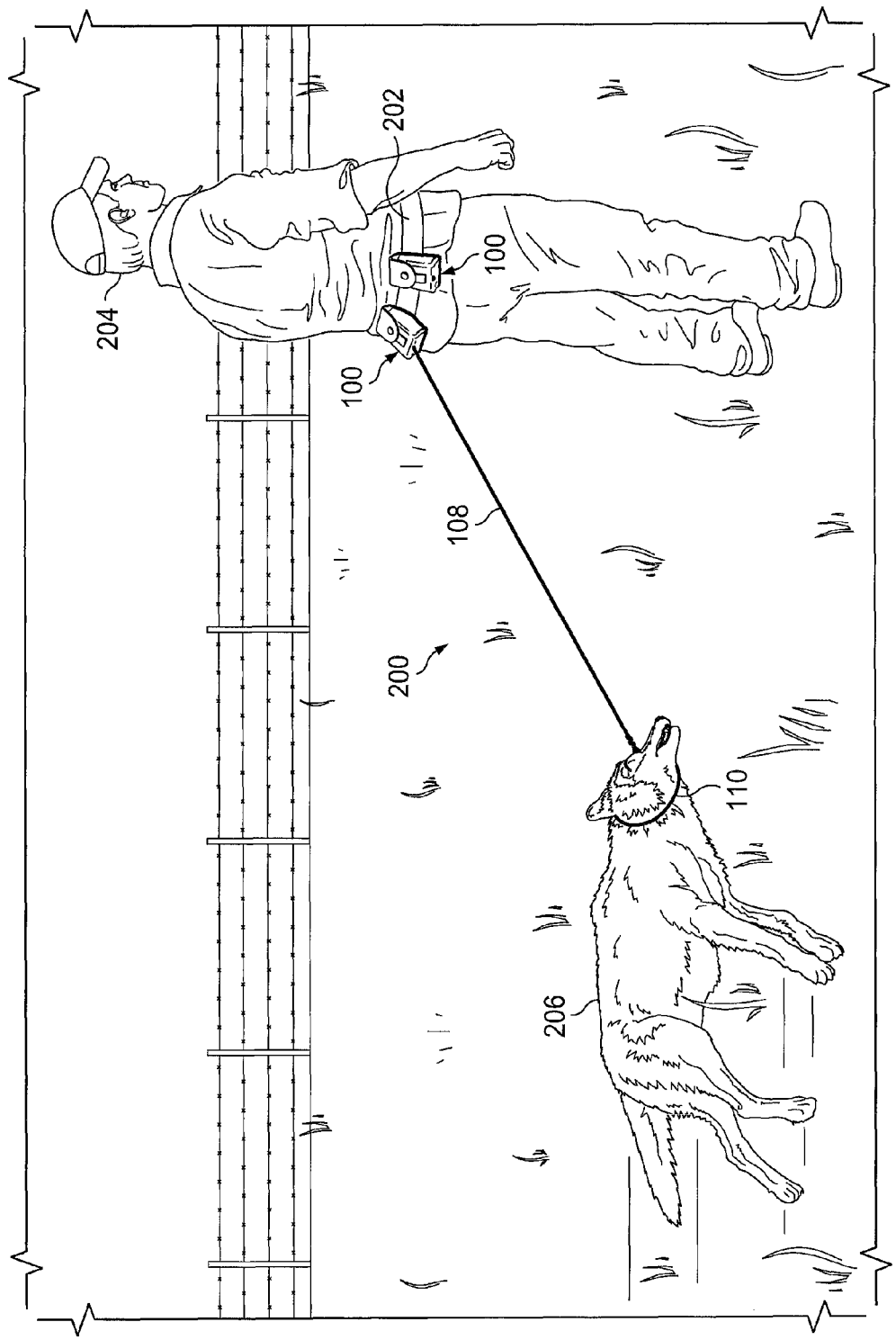
FIG. 4 illustrates the use of an embodiment 200 of the inventive assembly for dragging game or predators.

An embodiment 200 of the assembly provided by the present invention for dragging game or predators is illustrated in FIG. 4. The inventive assembly 200 comprises: (a) a belt or waist strap 202 which is worn around the waist of the hunter 204 and (b) one or more, preferably a plurality, of the inventive dragging apparatuses 2 or the inventive dragging apparatuses 100 carried on the back side of the belt or waste strap 202. In FIG. 4, two of the inventive dragging apparatuses 100 are shown as being carried on the belt or waste strap 202. As also illustrated in FIG. 4, the loop 110 of the dragging cord 108 of one of the dragging apparatuses 100 has been placed around the neck of a coyote 206 for dragging.

The use of a plurality of inventive dragging apparatuses 2 or 100 in the inventive assembly 200 allows the hunter 204 to drag two, three, or more predators or other animals 206 at one time while also keeping the hands, arms, and shoulders of the hunter 204 free for other purposes.

Thus, the present invention is well adapted to carry out the objects and attain the ends and advantages mentioned above as well as those inherent therein. While presently preferred embodiments have been described for purposes of this disclosure, numerous changes and modifications will be apparent to those of ordinary skill in the art. Such changes and modifications are encompassed within this invention as defined by the claims.

What is claimed is:

1. An apparatus for dragging game or predators comprising:
   a container having a top opening, a cover for opening and closing the top opening, a holding structure for holding the container on a belt or waist strap, and a reinforced opening; and
   a dragging cord which can be coiled and placed in or removed from the container through the top opening, the dragging cord having a proximal end with a knot or other retaining structure retained by the reinforced opening, a distal end which is receivable in the container for storage and is extendable from the top opening of the container for dragging a dead animal, and a loop provided at the distal end of the dragging cord which is expandable and contractible for placement around a portion of a body of the dead animal.

2. The apparatus of claim 1 wherein the holding structure of the container comprises an exterior loop for receiving the belt or waist strap.

3. The apparatus of claim 1 wherein the container is a pouch.

4. The apparatus of claim 1 wherein the reinforced opening is provided through a bottom portion of the container.

5. An assembly for dragging game or predators comprising:
   a belt or waist strap having a back segment for positioning on a back side of a user;
   one or more containers carried on the back segment of the belt or waist strap, each container having a top opening, a cover for opening and closing the top opening, and a reinforced opening; and
   a dragging cord for each container which can be coiled and placed in or removed from the container through the top opening, the dragging cord having a proximal end with a knot or other retaining structure retained by the reinforced opening, a distal end which is receivable in the container for storage and is extendable from the top opening of the container a distance sufficient to extend from the container when carried and positioned on the belt or waist strap and the game or predator lying on the ground, and a loop provided at the distal end of the dragging cord which is expandable and contractible for placement around a portion of a body of the animal.

6. The assembly of claim 5 wherein each said container comprises an exterior loop through which the belt or waist strap is received.

7. The assembly of claim 5 wherein each said container is a pouch.

8. The assembly of claim 5 comprising a plurality of the containers carried by the belt or waist strap.

9. The assembly of claim 5 wherein the reinforced opening is provided through a bottom portion of the container.

10. A method using the assembly of claim 5 to drag a coyote or bobcat comprising the steps of:
   a) securing the assembly to the waist of a user by placing the belt or waist strap of the assembly on the user so that the one or more containers are positioned on the back side of the user;
   b) extending the dragging cord from one of the containers to a coyote or bobcat lying on the ground;
   c) expanding the loop provided at the distal end of the dragging cord and placing the loop around a portion of the body of the coyote or bobcat;
   d) tightening the loop around the portion of the body of the coyote or bobcat;

e) dragging the coyote or bobcat for a distance to a desired location using the assembly secured to the user as the user walks to the desired location; and f) removing the loop from the portion of the body of the coyote or bobcat.

\* \* \* \* \*